Dec. 8, 1931.    V. H. HARBERT    1,835,155
PIPE CLAMP
Filed April 14, 1928
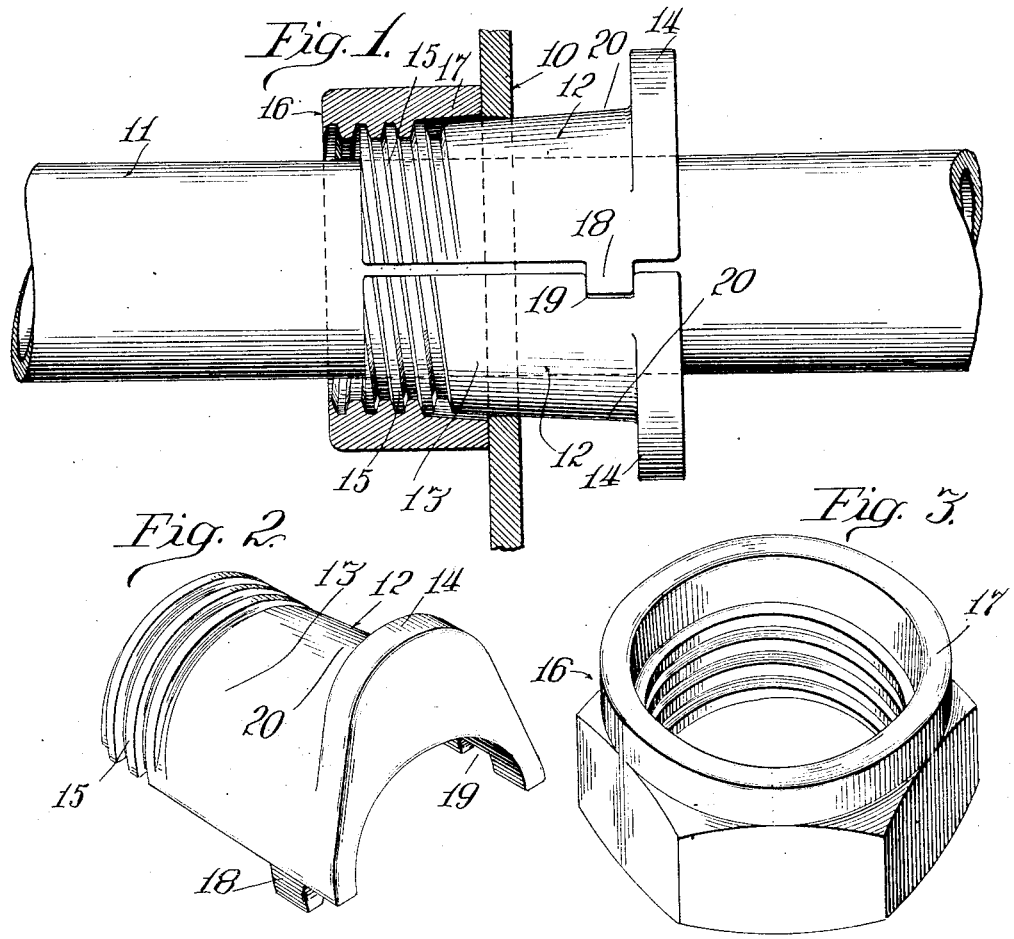
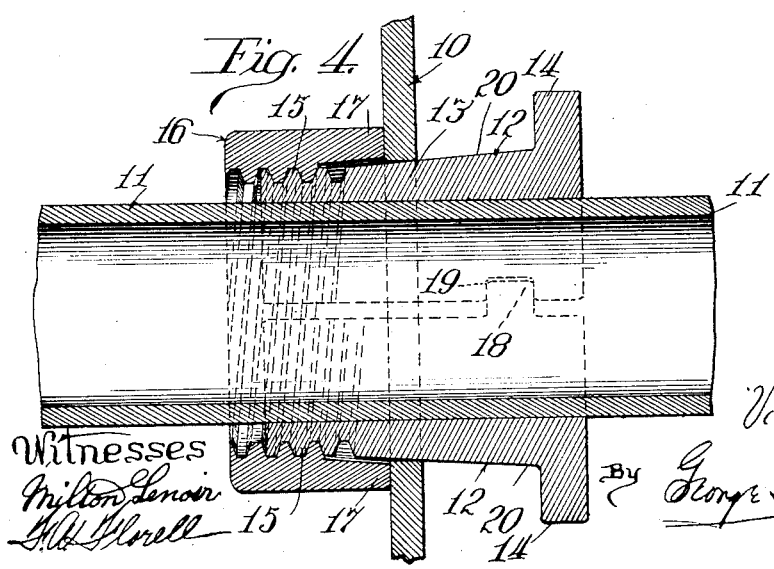
Inventor
Victor H. Harbert,
By George Heidman.
Attorney
Witnesses
Milton Lenoir
H. H. Florell Patented Dec. 8, 1931

1,835,155

UNITED STATES PATENT OFFICE

VICTOR H. HARBERT, OF CHICAGO, ILLINOIS

PIPE CLAMP

Application filed April 14, 1928. Serial No. 269,922.

My invention relates to means more especially intended for clamping the air pipes of the air brake system of railroad cars in place; and involves means adapted to cooperate with certain portions of the car underframe for effecting a firm anchor for the air pipe which usually extends longitudinally beneath the car.

The invention contemplates simple and yet effective means which may be easily applied; its application to air lines being readily accomplished by applying the fastening or nut element to the longitudinal section of the air pipe before it is connected to the adjacent pipe sections of the air line; the other elements of the clamp being applied after installation of the pipes has been made.

While my invention is especially intended for pipes of air brake systems, it is apparent that it is adapted to other uses without change or material modification.

The objects and advantages of my invention will be readily comprehended from the detailed description of the drawings, wherein—

Figure 1 is a side elevation with portions in section illustrating the application of the clamp to a section of air line or pipe as disposed longitudinally beneath a car and extending through an underframe member.

Figure 2 is a perspective view of one of the pair of clamp elements.

Figure 3 is a perspective view of the fastening element of my improved means.

Figure 4 is a longitudinal sectional view of the installation shown in Figure 1.

My improved means as expressed in the drawings is especially intended for clamping the horizontally disposed pipes or air line sections which are disposed longitudinally beneath the car and which are usually made to pass through suitable holes in the web portion of a transverse metallic member of the car underframe, a portion whereof is indicated at 10 in Figures 1 and 4.

The apertures in the cross members 10 of the car underframe through which the air lines or pipes 11 are disposed, are to be of a diameter larger than the external diameter of the pipe 11 so as to also receive my improved clamp means which consists of a pair of complementary members 12, 12, which are identical in construction. Each member 12 consists of the semi-cylindrical body portion 13 adapted to fit partially about the air pipe 11 and to be partially disposed through the opening in the cross-member of the underframe portion 10. The members 12 are preferably made of gradually increasing thickness toward the end which is provided with the laterally disposed ear or lobe 14; the thickness increasing to an extent greater than the space between the pipe and the wall of the aperture in order that an increasing wedging relation in the aperture of the cross-member of the underframe 10 may be effected when said complementary members are drawn lengthwise of the air pipe through the aperture in the underframe member.

The channels of the complementary members 12 in which the air pipe 11 seats is preferably such that the two complementary members 12 will not come into complete abutting relation with each other along their longitudinal edges, thus causing a greater gripping relation with the pipe when said members 12 are forced toward each other. The laterally disposed lobes 14 provide surfaces which may be easily tapped by a hammer to force said members through the opening in the cross-member of the underframe during the initial application of the clamp to the pipe.

The opposite ends of both members 12, 12 are threaded as shown at 15, with the threads of one member aligned with those of the other and constituting a continuation thereof, as shown in Figure 1, in order to receive the internally threaded circular member or nut 16 shown in detail in Figure 3. The nut member 16 on one side is shown preferably provided with a circumferential flange portion 17, disposed beyond the threaded portion, which is adapted to bear against the cross-member of the underframe 10 when said nut member has been screwed onto the threaded ends 16 of the complementary members 12, 12.

In order that the complementary members, which are identical in construction, may be properly positioned and caused to move and act in unison, I prefer to provide one of the longitudinal sides of each member 12, at the non-threaded or lobe end thereof, with a circumferentially disposed lug 18, while the opposite longitudinal side is provided with a circumferentially disposed slot or indentation 19 adapted to receive the lug 18 of the other member 12. That is to say, when the device is assembled, one member 12 has the slot while the other member has the lug on one side; while the reverse is true on the opposite side of the device. It is apparent that the two members are thus properly positioned to bring their respective threads into alignment with each other and both members induced to move in unison.

With the two members positioned above the air line or pipe 11 and inserted through the opening in the cross-member 10 of the underframe, the nut member 16 (previously slipped onto the pipe section before it is coupled to adjacent sections) is then screwed onto the threaded ends of the complementary members 12, disposed on the side of the cross-member of the underframe opposite to that on which the lobed ends of said members are located, with the result that a firm screwing up of the nut member 16 will bring its flange portion 17 in abutting relation with the underframe portion of the car and cause the complementary members 12, 12 to be drawn through the opening in the cross-member. As the members are provided with a wall of increasing thickness toward the lobes 14 thereof as shown at 20 in Figure 4, it is apparent that an increasing wedging relation is not only effected between said members 12, 12 and the car underframe, but said complementary members 12, 12 are also forced into a firmer gripping relation with the sides of the pipe 11; it being understood, of course, that the slots or indentations 19 on the complementary members 12, 12 are of depth sufficient to prevent a complete seating of the lugs 18 therein so as to permit movement of the longitudinal perimeters or sides of the complementary members 12, 12 toward each other.

With my improved clamping means the pipes will be rigidly held against vibration and longitudinal movement thereof during train operation prevented and strains on the pipe connections eliminated.

The wedging relation is preferably obtained by the increased thickness of the entire member 12, although only a portion along the longitudinal center line may be of increasing thickness and other modifications may be made without, however, departing from the spirit of my invention.

What I claim is:

A pipe clamp comprising a pair of semi-cylindrical members whose plain outer faces are tapered, the non-tapered portions at the ends of the plain tapered portions of said members being externally threaded, one longitudinal side of each member having a lug while the other longitudinal side of each member is provided with a socket, with the lug and socket of one member being arranged on the longitudinal sides opposite to those on the other member so as to permit the lug of the one member to fit into the socket of the other member whereby longitudinal movement of said members independently of each other is prevented, and an internally threaded encircling member adapted to screw onto the threaded ends of said pair of members whereby the lugs and sockets are moved into engagement with each other and the pair of members forced into clamping relation with the pipe.

VICTOR H. HARBERT.